United States Patent
Nguyen

(10) Patent No.: US 9,166,472 B2
(45) Date of Patent: Oct. 20, 2015

(54) EMI FILTERING FOR ACTIVE RECTIFIER POWER SYSTEMS

(71) Applicant: Hamilton Sundstrand Corporation, Windsor Locks, CT (US)

(72) Inventor: Vietson M. Nguyen, Rockford, IL (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 479 days.

(21) Appl. No.: 13/649,919

(22) Filed: Oct. 11, 2012

(65) Prior Publication Data

US 2014/0104901 A1    Apr. 17, 2014

(51) Int. Cl.
*H02M 1/44* (2007.01)
*H02M 7/219* (2006.01)
*H04B 3/00* (2006.01)
*H02M 1/12* (2006.01)

(52) U.S. Cl.
CPC ............... *H02M 1/44* (2013.01); *H02M 7/219* (2013.01); *H02M 1/126* (2013.01); *Y02B 70/1408* (2013.01)

(58) Field of Classification Search
USPC ........................................................... 307/90
See application file for complete search history.

(56) References Cited

U.S. PATENT DOCUMENTS

| | | | | |
|---|---|---|---|---|
| 5,311,419 A | * | 5/1994 | Shires | 363/65 |
| 8,325,500 B2 | * | 12/2012 | Schueneman | 363/47 |
| 2013/0258725 A1 | * | 10/2013 | Colombi et al. | 363/37 |

* cited by examiner

*Primary Examiner* — Robert Deberadinis
(74) *Attorney, Agent, or Firm* — Kinney & Lange, P.A.

(57) ABSTRACT

A system for filtering electromagnetic interference (EMI) includes a power source that provides alternating current (AC) power; a load; an active rectifier that converts AC power from the power source to direct current (DC) power for the load; and a filter connected between the power source and the active rectifier, wherein the filter comprises at least one notch filter that filters selected frequencies of EMI generated by the active rectifier.

15 Claims, 3 Drawing Sheets

EMI FILTERING FOR ACTIVE RECTIFIER POWER SYSTEMS

BACKGROUND

The present invention is related to power systems, and in particular to a system and method for filtering electromagnetic interference (EMI) in active rectifier power systems.

Aircraft systems, such as motor drive systems, often require direct current (DC) power for operation. The main sources of power onboard aircraft are generally gas turbine engine driven alternating current (AC) generators. These generators provide polyphase AC power that must be converted into DC power for use in the motor drive and other DC systems. In order to convert the polyphase AC power from the AC power sources into DC power, active rectifiers are often used.

Active rectifiers, such as Vienna rectifiers for three-phase power systems, utilize switches in conjunction with diodes in order to provide efficient rectification. The DC output power of these rectifiers may be controlled using pulse-width modulation (PWM). When implementing PWM, a switching controller enables and disables the switches for the three phases of the Vienna rectifier at a selected frequency. This switching creates source frequency harmonics and EMI in the form of electrical current within the power system that can propagate back through the generator and into other aircraft systems. In some cases, EMI may be generated with larger than desired magnitudes at the frequency bands at or around harmonic frequencies of the selected switching frequency. It is desirable to minimize the effects of this generated EMI within these power systems.

SUMMARY

A system for filtering electromagnetic interference (EMI) includes a power source, a load, an active rectifier and a filter. The power source provides alternating current (AC) power. The active rectifier converts AC power from the power source to direct current (DC) power for the load. The filter is connected between the power source and the active rectifier, and comprises at least one notch filter that filters selected frequencies of EMI generated by the active rectifier.

DETAILED DESCRIPTION

The present invention describes a system and method for filtering electromagnetic interference (EMI) generated in active rectifier power systems. The system includes a power source, an EMI filter, an active rectifier, and a load. The power source is any alternating current (AC) power source such as, for example, polyphase AC power received from a generator onboard an aircraft. The active rectifier is a circuit capable of converting AC power from the AC power source into DC power using at least one switching device. This active rectifier may be any known rectifier such as, for example, a Vienna rectifier. The DC power is provided to, for example, a motor drive or any other load that requires DC power. The EMI filter is connected between the AC power source and the active rectifier in order to filter EMI generated by the switching devices of the active rectifier. The EMI filter includes at least one notch filter to filter EMI generated at harmonic frequencies of the selected switching frequency of the one or more switching devices in the active rectifier. This reduces the EMI that is propagated back to the power source as well as other equipment connected to the power source.

Figure 1:
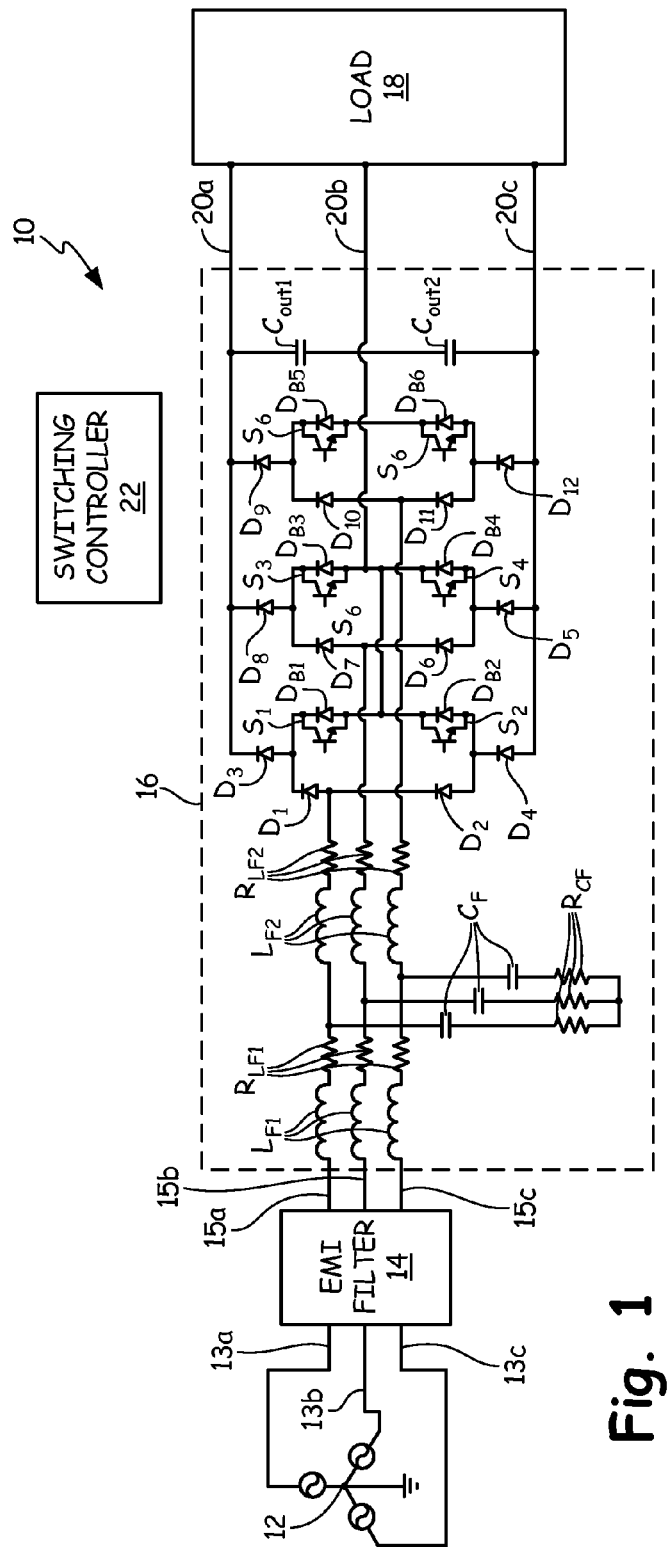
FIG. 1 is a circuit diagram illustrating a power system that includes an EMI filter according to an embodiment of the present invention.

FIG. 1 is a circuit diagram illustrating system 10 for filtering EMI according to an embodiment of the present invention. System 10 includes power source 12, EMI filter 14, active rectifier 16, and load 18. In the present embodiment, power source 12 is a three-phase AC power source connected to EMI filter 14 through filter inputs 13a-13c. EMI filter outputs 15a-15c connect to active rectifier 16. In other embodiments, power source 12 may include any number of phases. Although illustrated as a specific type of Vienna rectifier, active rectifier 16 may be implemented as any known active rectifier circuit. Load 18 is any load that requires DC power such as, for example, an electric motor drive.

Load 18 is provided DC power on a dual-DC bus comprising outputs 20a-20c from active rectifier 16. Output 20a provides positive DC voltage from active rectifier 16; output 20c provides negative DC voltage from active rectifier 16; and output 20b is a neutral output from active rectifier 16. This type of dual-DC bus configuration provides better efficiency for loads such as, for example, motor drives.

Active rectifier 16 is used to convert the three-phase AC power provided by power source 12 into DC power provided on the dual-DC bus. Active rectifier 16 includes an LCL filter consisting of inductors $L_{F1}$ and $L_{F2}$, corresponding resistances $R_{LF1}$ and $R_{LF2}$, capacitors $C_F$, and corresponding resistances $R_{CF}$. This LCL filter is implemented to filter some of the EMI within system 10 and reduce the low frequency (source frequency) harmonic ripples propagating back to the source through the use of the three "boost inductors" $L_{F2}$ of active rectifier 16. Active rectifier 16 also includes switches $S_1$-$S_6$, diodes $D_1$-$D_{12}$, body diodes $D_{B1}$-$D_{B6}$, and output capacitors $C_{OUT1}$ and $C_{OUT2}$. Switches $S_1$-$S_6$ are controlled by switching controller 22. Switching controller 22 is implemented using any suitable controller such as, for example, a microcontroller. Switching controller 22 utilizes, for example, pulse-width modulation (PWM) to control switches $S_1$-$S_6$ in order to control the output voltage on the dual-DC bus. This Vienna-type active rectifier 16 allows unidirectional power (energy) flow between the input and output of the power conversion system (from AC to DC). Although illustrated as a single rectifier, active rectifier 16 may comprise multiple active rectifiers in parallel to provide better performance.

Switches $S_1$-$S_6$ are enabled by switching controller 20 at a selected switching frequency ($F_S$). Switches $S_1$-$S_6$ are any known switches such as, for example, metal-oxide-semiconductor field-effect transistors (MOSFETs) or insulated gate bipolar transistors (IGBTs). EMI is generated by the switching of switches $S_1$-$S_6$. The magnitude of this generated EMI may be greater at certain frequencies, such as the harmonic frequencies of the switching frequency ($F_S$). This EMI is propagated back to power source 12, which may also be propagated to other systems connected to power source 12.

Figure 2:
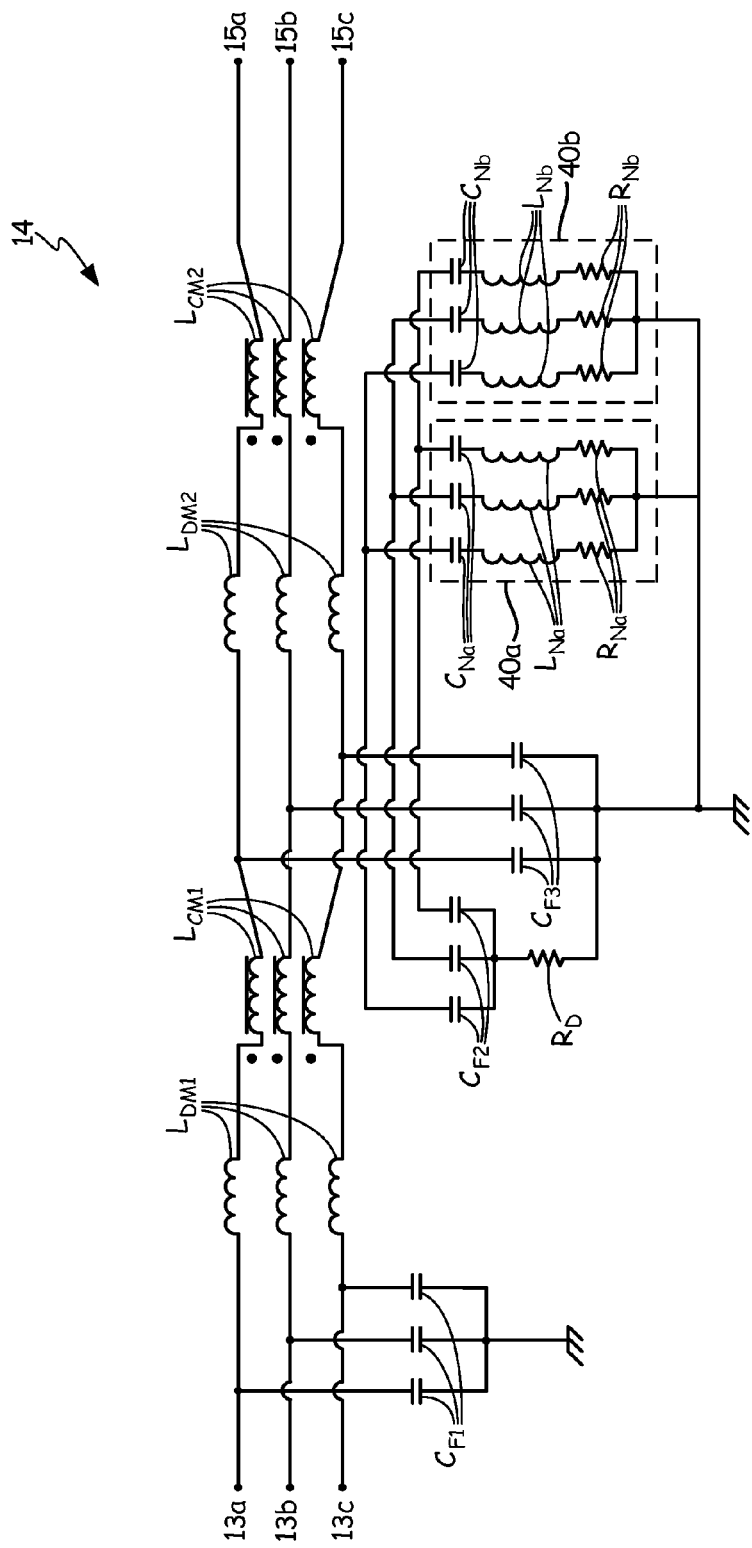
FIG. 2 is a circuit diagram illustrating an EMI filter according to an embodiment of the present invention.

FIG. 2 is a circuit diagram illustrating EMI filter 14 according to an embodiment of the present invention. EMI filter 14 includes filter inputs 13a-13c, differential-mode inductors $L_{DM1}$ and $L_{DM2}$, common-mode inductors $L_{CM1}$ and $L_{CM2}$, filter capacitors $C_{F1}$, $C_{F2}$ and $C_{F3}$, damping resistor $R_D$, notch filters 40a and 40b, and filter outputs 15a-15c. Notch filters 40a and 40b include capacitors $C_{Na}$ and $C_{Nb}$, inductors $L_{Na}$ and $L_{Nb}$, and resistors $R_{Na}$ and $R_{Nb}$, respectively. Differential-mode inductors $L_{DM1}$ and $L_{DM2}$, along with filter capacitors $C_{F1}$, $C_{F2}$ and $C_{F3}$ are implemented to filter out differential-mode noise within system 10. Common-mode inductors $L_{CM1}$ and $L_{CM2}$ are utilized to filter out common-mode noise within system 10. Common-mode inductors $L_{CM1}$ and $L_{CM2}$ are mutually-coupled three-phase inductors. Although illustrated with two common-mode filters and two differential-mode filters, EMI filter 14 may contain any number of common-mode and differential-mode filters. Resistor $R_D$ is implemented to provide damping to counteract any resonance within EMI filter 14.

Notch filters 40a and 40b are band-stop filters implemented to filter EMI at selected frequencies. In one embodiment, switches $S_1$-$S_6$ are enabled at a frequency ($F_S$) of 50 KHz. In other embodiments, $S_1$-$S_6$ may be enabled at frequencies ($F_S$) both greater than, and less than, 50 KHz. A switching frequency of around 50 kHz is a preferable switching frequency for aircraft high power active rectifiers employing either silicon (Si) conventional power MOSFETs or silicon-carbide (SiC) power MOSFETs. At 50 KHz, EMI spikes may be generated at, for example, the frequency bands around the third and fourth harmonic frequencies (150 KHz and 200 KHz). Regulations may require that the magnitude of these EMI spikes fall below predetermined levels. Thus, notch filters 40a and 40b are implemented to filter noise at 150 KHz and 200 KHz. While this embodiment discloses two notch filters at the third and fourth harmonic frequencies, any number of notch filters may be implemented to filter EMI generated at given frequencies caused by switching of switches $S_1$-$S_6$. In the present embodiment, notch filters 40a and 40b are illustrated as RLC filters for each phase. In other embodiments, notch filters 40a and 40b may be implemented using any known stop-band filter.

Figure 3:
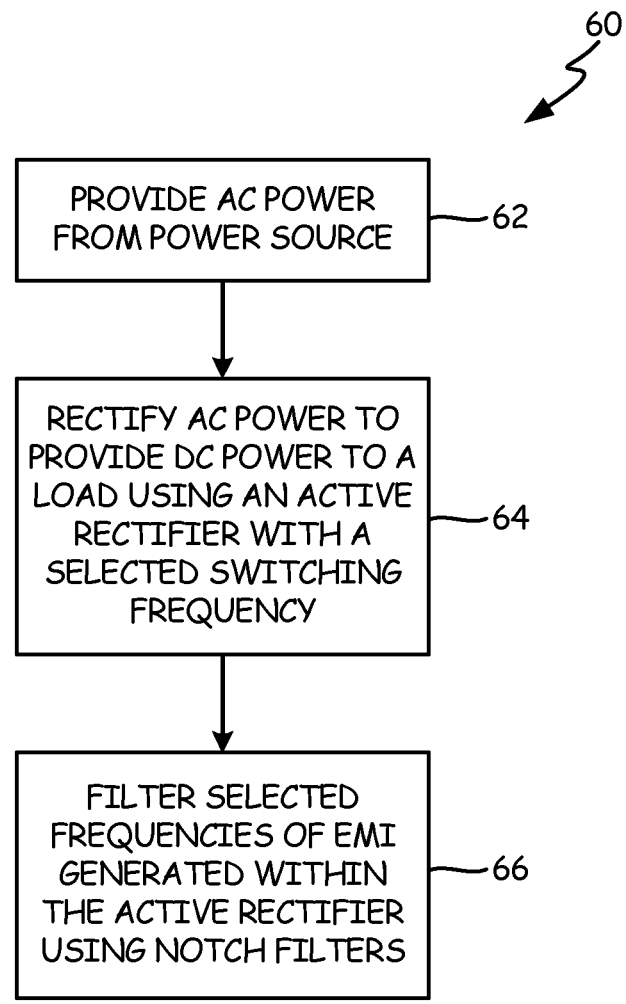
FIG. 3 is a flowchart illustrating a method for filtering EMI according to an embodiment of the present invention.

FIG. 3 is a flowchart illustrating method 60 for filtering EMI according to an embodiment of the present invention. At step 62, three-phase AC power is provided by power source 12. At step 64, AC power is converted to DC power by active rectifier 16 and provided to load 18 on a dual-DC bus. This is accomplished using switching controller 22 using a selected switching frequency ($F_S$). At step 66, notch filters 40a and 40b filter selected frequencies of EMI generating by the switching of switches $S_1$-$S_6$. In the present embodiment, notch filters 40a and 40b are implemented to filter EMI generated at the third and fourth harmonic frequencies of the switching frequency ($F_S$).

The following are non-exclusive descriptions of possible embodiments of the present invention.

A system for filtering electromagnetic interference (EMI) according to an exemplary embodiment of this disclosure, among other possible things includes: a power source that provides alternating current (AC) power, a load, an active rectifier that converts AC power from the power source to direct current (DC) power for the load, and a filter connected between the power source and the active rectifier, wherein the filter comprises at least one notch filter that filters selected frequencies of EMI generated by the active rectifier.

The system of the preceding paragraph can optionally include, additionally and/or alternatively, any one or more of the following features, configurations and/or additional components.

The active rectifier includes at least one switch enabled at a selected switching frequency.

The selected frequencies of EMI are the frequency bands located at or around harmonic frequencies of the selected switching frequency.

The at least one notch filter includes a first notch filter selected to filter EMI generated at a third harmonic frequency of the selected switching frequency, and a second notch filter selected to filter EMI generated at a fourth harmonic frequency of the selected switching frequency.

The selected switching frequency is at or around 50 kHz.

The power source is a three-phase power source.

The filter further includes at least one common-mode filter that filters common-mode noise for each phase, and at least one differential-mode filter that filters differential-mode noise for each phase.

The load is a motor drive.

The active rectifier is a Vienna rectifier.

A method of filtering electromagnetic interference (EMI) according to an exemplary embodiment of this disclosure, among other possible things includes: providing alternating current (AC) power from a power source to an active rectifier, converting the AC power to direct current (DC) power using the active rectifier, wherein the DC power is provided to a load, and filtering EMI generated within the active rectifier using an EMI filter, wherein the EMI filter includes at least one notch filter.

The method of the preceding paragraph can optionally include, additionally and/or alternatively, any one or more of the following features, configurations and/or additional components.

Converting the AC power to DC power can comprise enabling at least one switch at a selected switching frequency.

Filtering EMI generated within the active rectifier can comprise filtering EMI at the frequency bands around harmonic frequencies of the selected switching frequency using the at least one notch filter.

Filtering EMI generated within the active rectifier can include filtering EMI at a third harmonic frequency of the selected switching frequency using a first notch filter, and filtering EMI at a fourth harmonic frequency of the selected switching frequency using a second notch filter.

The power source can be a three-phase AC power source.

A filter connectable between an alternating current (AC) power source and an active rectifier, wherein the active rectifier converts AC power to direct current (DC) power for a load according to an exemplary embodiment of this disclosure, among other possible things includes: at least one notch filter that filters selected frequencies of electromagnetic interference (EMI) generated within the active rectifier, at least one common-mode filter that filters common-mode interference between the power source and the active rectifier, and at least one differential-mode filter that filters differential-mode interference between the power source and the active rectifier.

The filter of the preceding paragraph can optionally include, additionally and/or alternatively, any one or more of the following features, configurations and/or additional components.

The active rectifier comprises at least one switch enabled at a selected switching frequency.

The selected frequencies are harmonic frequencies of the selected switching frequency.

The at least one notch filter includes a first notch filter that filters EMI at a third harmonic frequency of the selected switching frequency, and a second notch filter that filters EMI at a fourth harmonic frequency of the selected switching frequency.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for filtering electromagnetic interference (EMI) comprising:
   a power source that provides alternating current (AC) power;
   a load;
   an active rectifier that converts AC power from the power source to direct current (DC) power;
   a dual-DC bus configured to provide the DC power to the load, including a positive line, a negative line, and a midpoint line; and
   a filter connected between the power source and the active rectifier, wherein the filter comprises at least one notch filter configured to filter at least third harmonic frequencies of EMI generated by the active rectifier.

2. The system of claim 1, wherein the active rectifier comprises at least one switch enabled at a switching frequency.

3. The system of claim 2, wherein the at least one notch filter is further configured to filter frequency bands around harmonic frequencies of the selected switching frequency.

4. The system of claim 3, wherein the at least one notch filter comprises:
   a first notch filter selected to filter the third harmonic frequencies of EMI; and
   a second notch filter selected to filter fourth harmonic frequencies of EMI of the selected switching frequency.

5. The system of claim 2, wherein the selected switching frequency is around 50 kilohertz.

6. The system of claim 1, wherein the power source is a three-phase power source.

7. The system of claim 6, wherein the filter further comprises:
   at least one common-mode filter that filters common-mode noise for each phase; and
   at least one differential-mode filter that filters differential-mode noise for each phase.

8. The system of claim 1, wherein the load is a motor drive.

9. The system of claim 1, wherein the active rectifier is a Vienna rectifier.

10. A method of filtering electromagnetic interference (EMI), the method comprising:
    providing alternating current (AC) power from a power source to an active rectifier;
    converting the AC power to direct current (DC) power using the active rectifier;
    providing DC power to a load using a dual-DC bus that includes a positive line, a negative line, and a midpoint line; and
    filtering EMI generated within the active rectifier using an EMI filter that includes at least one notch filter configured to filter at least third harmonic frequencies of the EMI.

11. The method of claim 10, wherein converting the AC power to DC power comprises enabling at least one switch at a switching frequency.

12. The method of claim 11, wherein filtering EMI generated within the active rectifier comprises filtering EMI at frequency bands around harmonic frequencies of the selected switching frequency using the at least one notch filter.

13. The method of claim 11, wherein filtering EMI generated within the active rectifier comprises:
    filtering the EMI at the third harmonic frequency of the selected switching frequency using a first notch filter; and
    filtering EMI at a fourth harmonic frequency of the selected switching frequency using a second notch filter.

14. The method of claim 10, wherein the power source is a three-phase AC power source.

15. The method of claim 14, further comprising:
    filtering common-mode EMI for each phase using at least one common-mode inductor in the EMI filter; and
    filtering differential-mode EMI for each phase using at least one differential-mode inductor in the EMI filter.

* * * * *